No. 793,210. Patented June 27, 1905.

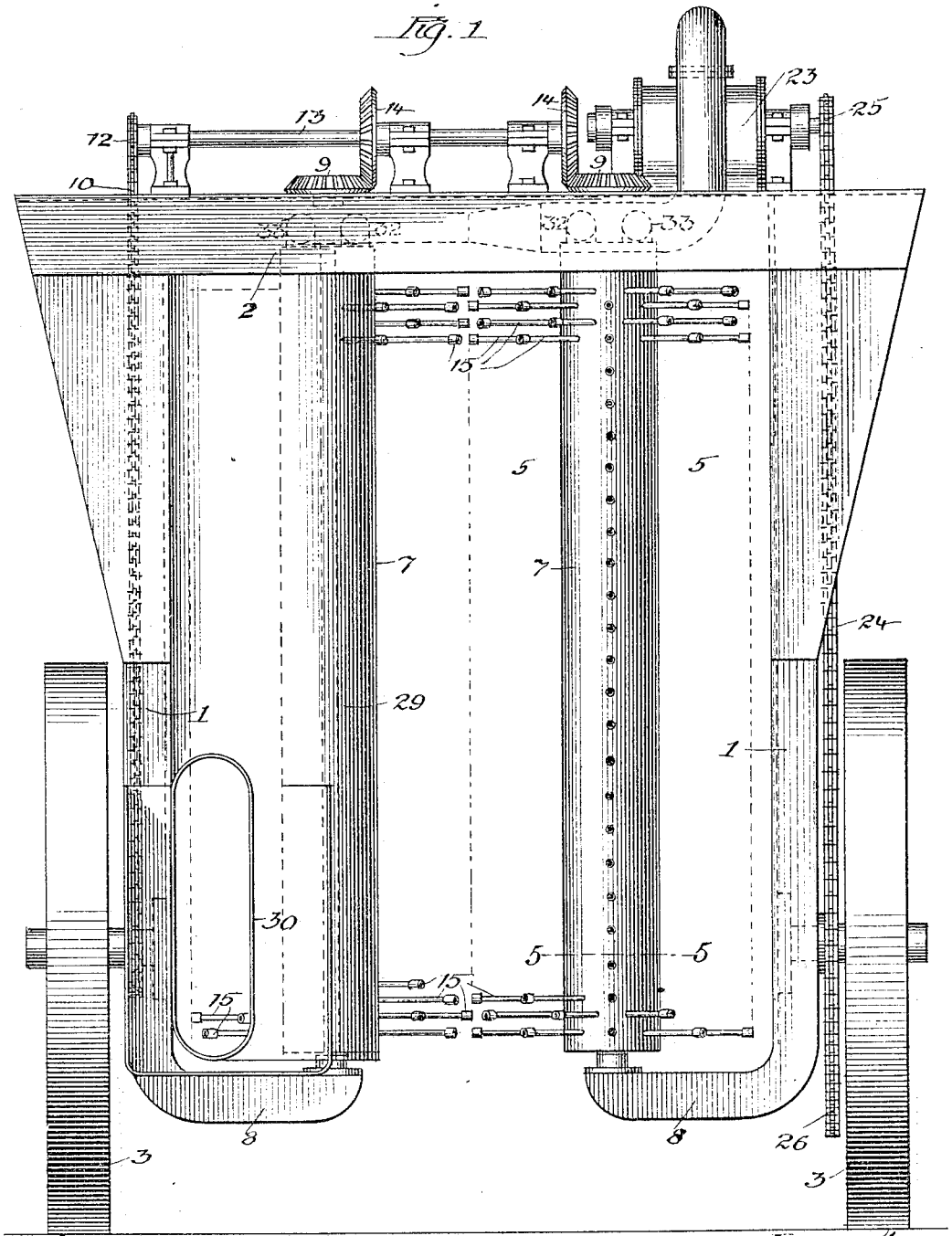

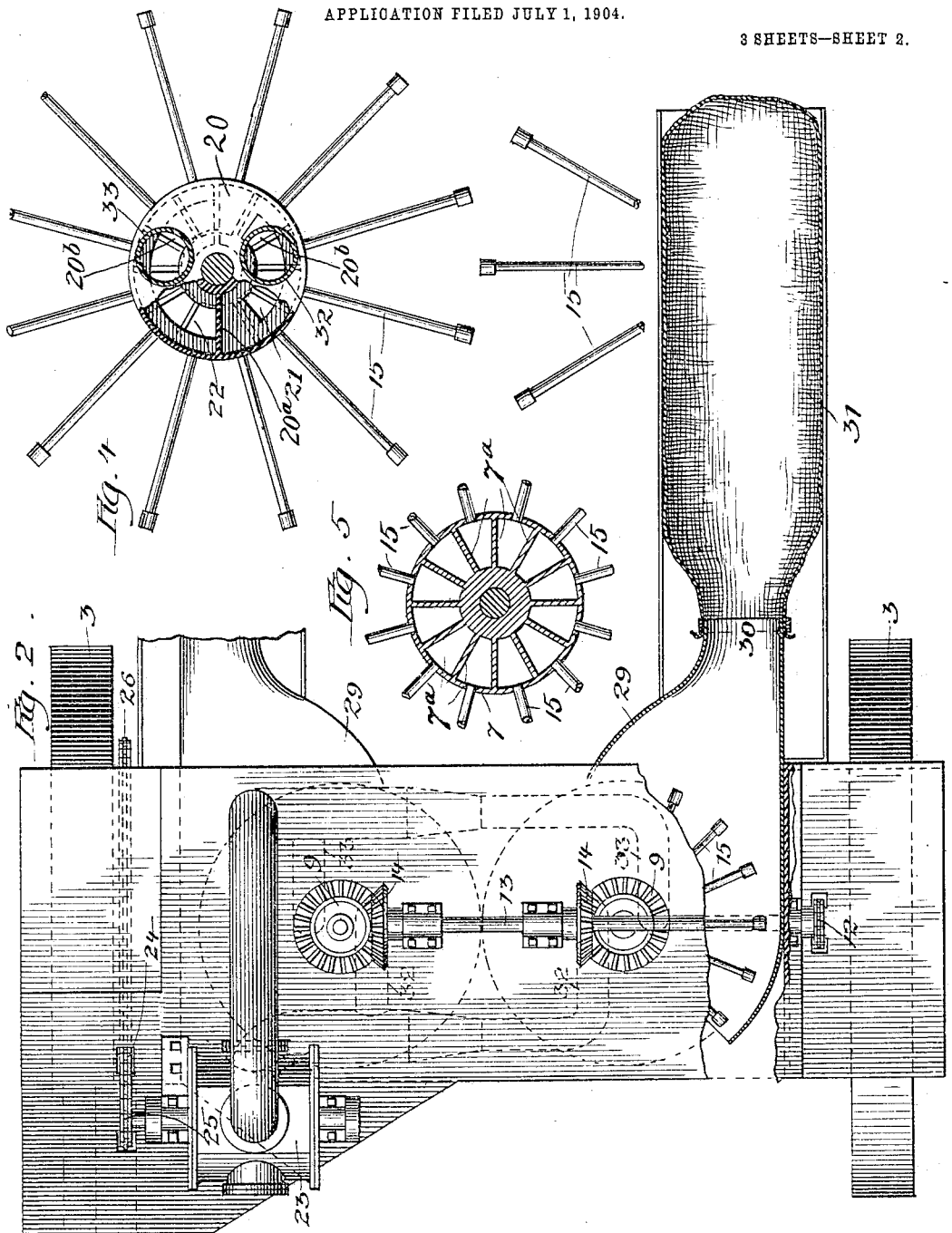

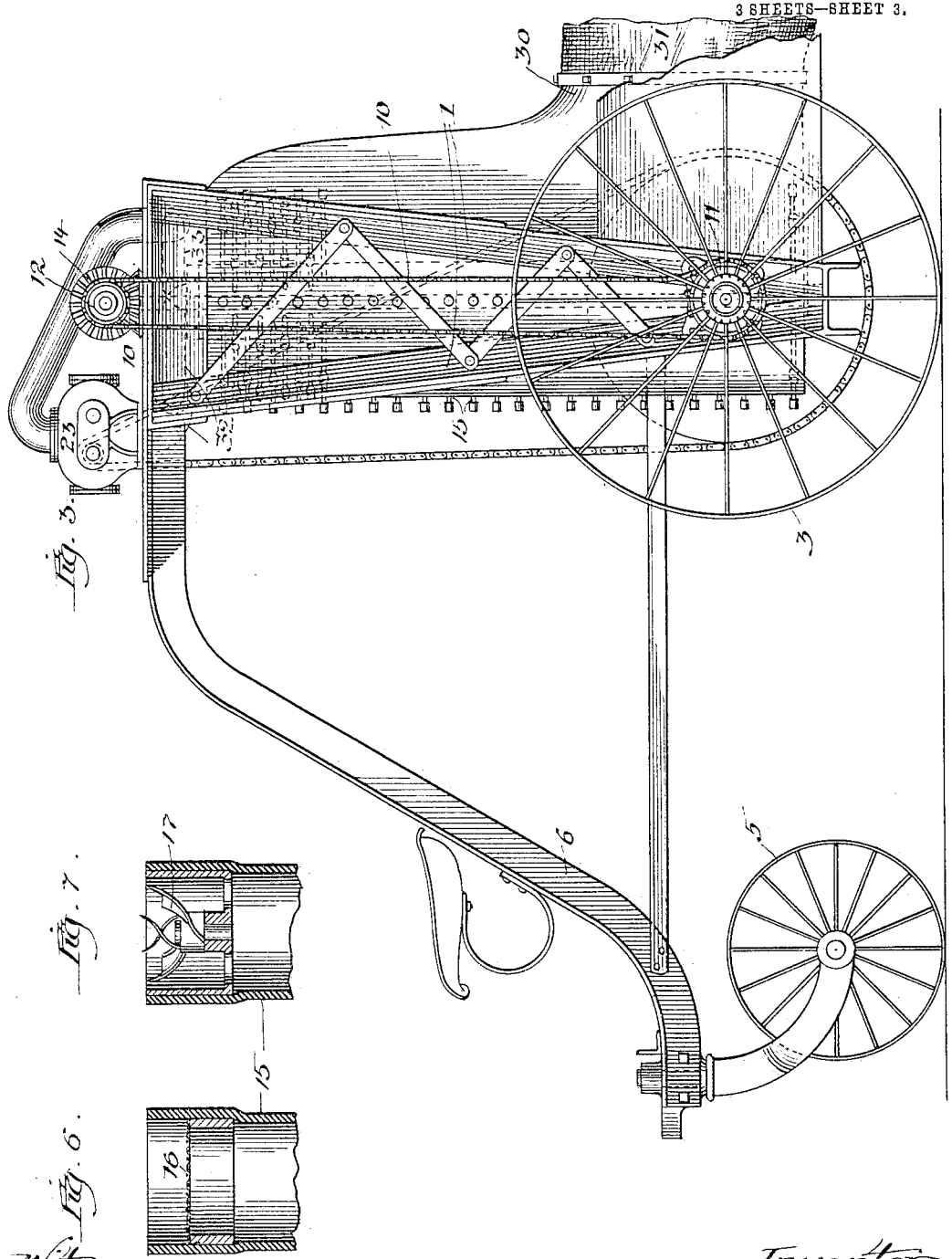

UNITED STATES PATENT OFFICE.

WENSEL MORAVA, OF CHICAGO, ILLINOIS.

COTTON-PICKER.

SPECIFICATION forming part of Letters Patent No. 793,210, dated June 27, 1905.

Application filed July 1, 1904. Serial No. 214,874.

*To all whom it may concern:*

Be it known that I, WENSEL MORAVA, a citizen of the United States, residing at Chicago, in the county of Cook and State of Illinois, have invented new and useful Improvements in Cotton-Pickers, of which the following is a specification, reference being had to the accompanying drawings, forming a part thereof.

The purpose of this invention is to provide an improved machine for picking cotton in the field, and particularly to avoid injury to the plants in such process.

It consists of the features of construction set out in the claims.

In the drawings, Figure 1 is a rear elevation of my improved cotton-picker with one of the receiving-hoods removed. Fig. 2 is a plan view of the same. Fig. 3 is a side elevation with certain parts broken away. Fig. 4 is a partly-sectional upper end plan view of one of the picking elements, section being made across the air-pipes and part of the register-plates being broken away to disclose the structure. Fig. 5 is a section at the line 5 5 on Fig. 1. Fig. 6 is a detail section axially through the terminal of one of the picking-fingers. Fig. 7 is a similar detail view showing a modified construction.

My machine is designed to travel along the rows of cotton-plants, having two traction-wheels adapted to run in adjacent lanes between the rows of plants while the machine strides the row for operating upon the plants in picking. For this purpose it comprises an inverted-U-shaped or downwardly-open bifurcated frame comprising the vertical limbs 1 1 and upper cross-neck 2, the same being high enough to pass above the tops of the highest cotton-plants when the machine travels along the row. The U-shaped frame is supported upon two traction-wheels 3 3, which are journaled near the lower ends of the frame-uprights 1 1, respectively. The frame has a third wheel 5, which is a caster-wheel, journaled at the forward lower end of the frame-arm 6, which extends from the upper end of one of the side uprights 1 forward in the vertical fore-and-aft plane of the traction-wheel at that side, so that the caster-wheel 5 may travel in the same lane as said traction-wheel. Suitable means for hitching a draft-animal or two or more tandem may be provided at the forward end of the arm 6. It is not considered necessary to show this means in the present drawings.

The picking means comprise upright cylinders 7 7, which are carried by the machine at the opposite sides of the row of plants to be operated upon. Each of the upright sides 1 of the frame has an inwardly-extending bearing-arm 8, in which the lower end of the cylinder at that side has its shaft stepped, said shaft obtaining a bearing at the upper end in the cross-neck 2, above which there is fast on the shaft a bevel-gear 9 for communicating power to rotate the cylinder. Such power is derived from one of the traction-wheels, being communicated by a chain 10, passing around a sprocket-wheel 11 rigid with said traction-wheel and a sprocket-pinion 12 on the horizontal shaft 13, mounted in journal-bearings above the cross-neck 2 of the frame, said shaft having bevel-gears 14 14, which mesh, respectively, with the bevel-gears 9 9 on the upper ends of the cylinder-shafts. The means by which these cylinders operate to pick the cotton consist of a multiplicity of flexible tubular fingers 15, projecting radially in all directions from said cylinders and being arranged in a plurality of vertical rows, said fingers being of such length that they extend to the mid-vertical plane between the cylinders from opposite sides, so that they intrude among the stems, branches, and twigs of the cotton-plants of the row which the machine strides in its operation and travel. The driving-train from the sprocket-wheel 11 to the cylinders is calculated to revolve the cylinders in such direction and at such speed that the flexible fingers 15 at about the middle point of their length will have a rearward horizontal movement substantially equal to the forward movement of travel of the machine over the ground, so that as said fingers interweave with the stems and branches of the plants in the travel of the machine they press only lightly upon said branches as the machine travels, the outer ends having the more rapid movement, tending to gather the branches rearward a little, while the inner ends near the cylinders having the slower movement tend to drag the branches forward a little before the fingers are withdrawn in the process of rotation of the cylinders. The tubular fingers 15 are preferably flexible, so that their action upon the branches may not tend to disturb them too forcibly in their passage through them, but may yield more or less to the branches as they pass in and out among them. For the purpose of such flexibility they are preferably made of rubber, reinforced, if necessary, for proper stiffness sufficiently to cause them normally to uphold their own weight without drooping materially at the ends when fully extended. They are open and preferably slightly enlarged at the ends to increase the mouth area. They are designed to operate upon the cotton-bolls which are sufficiently ripe to be plucked by means of suction or inward current of air induced by means hereinafter described, which will be sufficient to cause a cotton-boll close to which the end of any finger passes to be sucked onto the mouth of such finger. It is not intended that the boll should pass into the tubes, and therefore each finger is provided with means just back of its mouth for preventing the boll from passing in. A convenient means consists of a screen of woven wire 16, (see Fig. 6,) forward of which there is sufficient space for the boll to lodge without entering so far into the mouth as to be difficult to dislodge. A modification of this device is shown in Fig. 7, in which in lieu of the mere screen 16 there is a vane-wheel 17, which is rotated by the current of air, its fingers terminating in points which are turned in direction to screw into any boll which is sucked onto them by an incoming current of air. The construction of the cylinders 7 and the air connections about to be described is such as to cause the air to be sucked into the tubular fingers 15, while they are carried in the revolution of the cylinders through the plants—that is, at the inner side—and to be blown out through said fingers while they are revolving at the opposite portion of their circuit, during which, as hereinafter explained, they are within a hood within which the cotton-bolls will be blown off or out of their mouths at that part of the circuit and gathered into a receptacle.

The structure for producing inward and outward air-currents through the fingers will now be described. For this purpose each of the cylinders is subdivided into sectoral chambers by radial partitions $7^a$, corresponding in number to any desired number of vertical groups of fingers—that is to say, having such a vertical group of fingers 15 extending from each sectoral chamber—and at the upper end the cylinder is closed by a register-plate 20, having two apertures 21 and 22 at opposite sides of the fore-and-aft diametric plane, one of said apertures being connected, as hereinafter described, with the intake and the other with the discharge of an exhauster 23, which is mounted upon the cross-neck 2 and driven by a chain 24 around a pinion 25 on the exhauster-shaft from a sprocket-wheel 26 on the opposite traction-wheel from that which rotates the cylinders. In the register-plate 20 the register-aperture 21 at the inner side—that is, toward the row of plants—extends through a sufficient angle to register with the upper ends of as many of the sectoral chambers of the cylinders 7 as necessary to keep the corresponding number of vertical groups of the picking-fingers in communication with the exhauster for suction as may be at any time in engagement or contact with any portion of the plants, so that every finger that is near enough to the plants to possibly engage and pluck a boll of cotton therefrom is rendered operative for that purpose while in that position. The register-opening 22 at the opposite side may extend over a larger angle, giving more time for the discharge of the bolls into the gathering-hood or vertical conduit 29, which is made of light sheet metal mounted on the frame and encompassing the outer side of each cylinder through an angle corresponding to that of the register-aperture 22, the hood or vertical conduit 29 terminates rearwardly in a mouth 30, having provision for the attachment thereto of the mouth of a bag 31, which is made of open-meshed material open enough to avoid preventing the passage of the air therethrough and to avoid blocking the fan, but close enough to prevent the escape of the cotton-bolls, which are therefore blown into such bag until it is as full as desired, when it may be removed and another one substituted. The particular form of the register-plate by which it is adapted for connection of its respective apertures with the intake and discharge of the exhauster is a short hollow cylinder mounted about the bearing of the shaft of the cylinder 7, having its annular cavity divided into two chambers by a vertical partition $20^a$, the apertures 21 and 22 being in the lower disk or head of said short cylinder, the upper disk or wall having suitable, preferably circular, apertures $20^b$ $20^b$ for connection with the intake and exhaust pipes, respectively, of the exhauster. The exhauster 23 may be of any suitable construction having its intake connected by branch pipes 32 32, one running to each of the cylinders 7, and its discharge likewise connected by branch pipes 33 33, one running to each of the cylinders, the pipes 32 32 being, as stated, connected at the register-openings 21 at the inner side of the register-plate and the pipes 33 33 being connected at the register-openings 22 at the outer side of said plates.

I do not limit myself to the particular means shown for producing alternate suction and blast of air through the picking-fingers nor to the means for rotating such fingers. Any mechanic will readily devise many expedients and constructions adapted to reach the same result.

I claim—

1. In a cotton-picker, a carriage and mechanism thereon comprising hollow picking-fingers; means for intruding them into and withdrawing them from the plants as the carriage travels, and means for inducing air-currents through the fingers for detaching the bolls from the plants.

2. In a cotton-picker, a carriage or wheeled frame; hollow picking-fingers, and means for intruding them into and withdrawing them from the plants, and means for causing suction through such fingers for drawing the bolls to their mouths while they are intruded into the plants, and means for interrupting such suction while they are at the withdrawn position.

3. In a cotton-picker, a wheeled frame; hollow picking-fingers and mechanism for intruding them into the plants and withdrawing them as the frame travels along the ground; means for inducing suction through the fingers while they are intruded in the plants and for causing outward air-discharge through them while they are at withdrawn position.

4. In a cotton-picker, a wheeled frame; flexible hollow picking-fingers; means for intruding them into and withdrawing them from the plants as the frame travels, and means for inducing air-currents through the flexible fingers for detaching the bolls from the plants.

5. In a cotton-picker, a wheeled frame; hollow flexible picking-fingers; mechanism for intruding them into and withdrawing them from the plants as the frame travels, and means for inducing suction through such hollow fingers to draw the bolls through the mouths while they are intruded, from the plants, and means for interrupting such suction while they are at withdrawn position.

6. In a cotton-picker, a wheeled frame; hollow flexible picking-fingers and mechanism for intruding them among the plants and withdrawing them as the frame travels; means for inducing suction through the fingers while they are intruded, and for causing outward air-discharge from them while they are at withdrawn position.

7. In a cotton-picker, in combination with a frame adapted for travel along the rows of plants; hollow picking-fingers, and mechanism for intruding them into and withdrawing them from the plants as the frame travels; means for inducing suction through the fingers for drawing the bolls to their mouths while they are intruded, and for causing outward air-discharge through them when they are at withdrawn position; a hood in which the mouths of such fingers open when they are at such withdrawn position, and a receptacle into which such hood discharges.

8. In a cotton-picker, a carriage or wheeled frame; hollow picking-fingers, and mechanism for intruding them among the plants and withdrawing them therefrom as the frame travels over the ground; means for inducing suction through the fingers while they are at intruded position, and for causing outward air-discharge from them at withdrawn position; a hood encompassing the mouths of the fingers at the latter position, and a receptacle permeable to air, into which the hood discharges.

9. In a cotton-picker, hollow picking-fingers having open ends, and obstructed back of such ends to prevent the bolls being drawn back thereinto; means for inducing suction inward through such open ends, and mechanism for intruding the fingers into and withdrawing them from the plants.

10. In a cotton-picker, in combination with a suitable support and means adapting it to be moved over the ground, hollow picking-fingers carried by such support; means for inducing suction inward through the open ends of such fingers to cause the bolls to be drawn and held thereto, and for causing air-discharge outward through said fingers for delivering the bolls therefrom.

11. In a cotton-picker, hollow picking-fingers having open ends and having an obstruction permeable to air back of such ends, to prevent the bolls being drawn back therein; a suitable support for carrying such fingers along the ground with their ends exposed to the plants; means for inducing suction inward through such open obstructed ends, to cause the cotton-bolls to be drawn and held thereto, and for causing outward air-discharge through the same to deliver the bolls therefrom.

12. In a cotton-picker, in combination with a frame adapted to stride a row of plants, carrying-wheels supporting the ends of such frame at opposite sides of the row; a tube mounted upon either side arm of the frame, having a multiplicity of outwardly-extending hollow fingers open for the passage of air into and out of them; means for rotating such tubes, and means for drawing air thereinto through the fingers and for discharging air therefrom through the fingers substantially for the purpose set forth.

13. In a cotton-picker, in combination with a wheeled frame, a hollow rotary device thereon comprising a multiplicity of outwardly-extending hollow fingers open for the passage of air into and out of the same; an exhauster having connections from its intake and discharge respectively leading to such rotary device at opposite sides of the axis of rotation, and connections by which said fingers come into communication with the intake connection while they are at the part of their path of rotation toward the plants, and with the discharge connection while they are at their part of the path of rotation away from the plants.

14. In a cotton-picker, in combination with a wheeled frame, an upstanding cylinder mounted on said frame, such cylinder having radial partitions subdividing it into chambers; a multiplicity of hollow fingers leading outward from each chamber, such fingers being open for the passage inward and outward of air therethrough; a register-plate at the end of the cylinder having two apertures; an exhauster having its intake connected with one of said apertures, and its discharge connected with the other, and means for rotating the cylinder and for operating the exhauster as the machine travels.

15. In a cotton-picker, in combination with a wheeled frame, a rotary device mounted upstanding on such frame comprising a plurality of chambers grouped about the axis of rotation, and a multiplicity of hollow picking-fingers projecting from each chamber, open for the passage of air inward and outward therethrough; a register-plate which closes all the chambers at one end, having two openings; an air-exhausting device having its intake connected with one of said openings, and its discharge connected with the other, and means for rotating said rotary device as the machine travels.

16. In a cotton-picker, in combination with a bifurcated frame adapted to stride the row of cotton-plants, wheels supporting its two arms; an upstanding rotary device upon each arm comprising a plurality of groups of protruding hollow picking-fingers, each group comprising a multiplicity of such fingers distributed along the height of said rotary element, such fingers being open for the passage of air inward and outward therethrough, said rotary element comprising for each of said groups a separate chamber with which all the fingers of the group communicate; a register-plate which closes all the chambers at one end, having two openings; an air-exhausting device having its intake connected with one of said openings, and its discharge connected with the other, and means for rotating such rotary device as the machine travels along the row of plants.

17. In a cotton-picker, in combination with a bifurcated inverted-U-shaped frame adapted to stride a row of plants, wheels supporting its two ends; a rotary device mounted erect at the inner side of each of said arms in position to pass at opposite sides of the row as the machine travels, such rotary devices each comprising a plurality of air-chambers and a multiplicity of hollow picking-fingers extended from each chamber and distributed up and down along the length thereof, the fingers from the two rotary devices being of such length as to approximately meet midway between said rotary groups of chambers, and thereby to interlace with the plants as said devices rotate; an air-exhausting device and connections from the intake to the groups of chambers of rotary devices at one end thereof, adapted for communicating with said chambers at the inner side of their path of rotation, and connections from the discharge of said exhaust device leading to the said groups of rotary chambers adapted for communicating therewith at the outer side of their path of rotation.

18. In a cotton-picker, in combination with a supporting structure, hollow pickers and fingers carried thereby in position for approaching their ends to the plants; means for moving the fingers to cause them to approach and withdraw from the plants; means for inducing suction through such fingers for drawing the bolls to their mouths while they are in such approached position, and for interrupting such suction when they are at withdrawn position.

19. In a cotton-picker, in combination with a supporting-frame and hollow picking-fingers carried thereby in position to be approached to the plants, means for inducing suction through the fingers for drawing the bolls to their mouths while they are thus approached, and for causing outward air-discharge through them when they are withdrawn.

20. In a cotton-picker, in combination with a supporting-frame, hollow picking-fingers carried thereby in position to approach the plants as the frame is moved along the row of such plants; means for inducing suction through the fingers for drawing the bolls to their mouths while they are at such approached position, and for causing outward air-discharge through such fingers when they are at withdrawn position, and a hood in which the mouths of such fingers stand when at withdrawn position.

21. In a cotton-picker, in combination with a supporting-frame, hollow picking-fingers carried thereby in position to approach the plants as the frame is moved along the row of such plants; means for inducing suction through the fingers for drawing the bolls to their mouths while they are at such approached position, and for causing outward air-discharge through such fingers when they are at withdrawn position, and a receptacle into which such fingers discharge at withdrawn position.

In testimony whereof I have hereunto set my hand, in the presence of two witnesses, at Chicago, Illinois, this 24th day of June, 1904.

WENSEL MORAVA.

Witnesses:
  CHAS. S. BURTON,
  J. S. ABBOTT.